United States Patent Office.

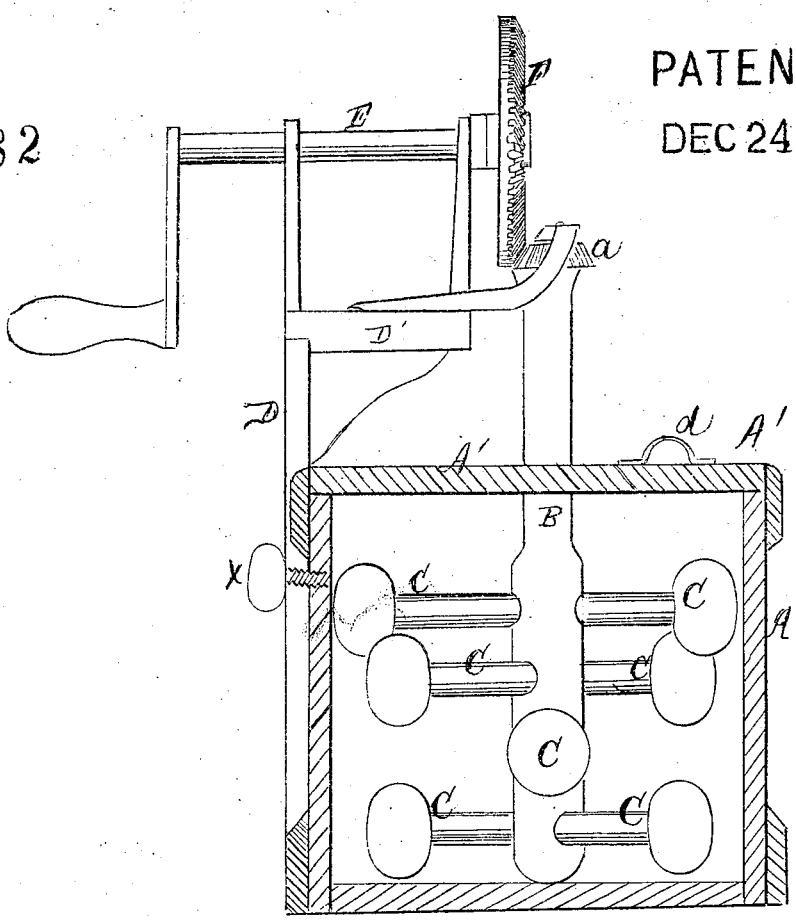
John Risher's Churn.
No. 72682
PATENTED DEC 24 1867
Witnesses.
Geo Wilson
Eddy Shaw
Inventor.
John Risher
per
Alexander Johnson
Atty

JOHN RISHER, OF DELAWARE, OHIO.

Letters Patent No. 72,682, dated December 24, 1867.

IMPROVEMENT IN CHURNS.

*The Schedule referred to in these Letters Patent and making part of the same.*

TO ALL WHOM IT MAY CONCERN:

Be it known that I, JOHN RISHER, of Delaware, in the county of Delaware, and in the State of Ohio, have invented certain new and useful Improvements in Churns; and I do hereby declare that the following is a full, clear, and exact description thereof, reference being had to the accompanying drawings, and to the letters of reference marked thereon, making a part of this specification.

In the annexed drawings, A represents a rectangular box, which is provided with a suitable lid, A', separated in the centre. Between the lid-sections A' is an opening, through which passes the dasher-shaft B. Said shaft is formed larger at the lower end, and revolves on a pivot in the bottom of the box. Upon this shaft is a series of arms, C, which are circular in form, and provided with balls on their extremities. These arms are at right angles with the shaft B, and placed at different angles from each other. Secured to the side of the box, and projecting over the top of the same, is a board, D, which is connected to the box by a set-screw, $x$. This board has an arm, D', upon which rest suitable bearings, which support the horizontal shaft E, which said shaft has a crank-handle at the outer end, and a faced cog-wheel, F, at the inner end. This faced cog F meshes into a faced cog-wheel, $a$, upon the top of the shaft B, so that, by turning the crank, the dasher-shaft, with its arms, C C, is made to revolve. $d$ represents a shield, covering an air-opening in the lid A', so that air can enter upon the cream in the box, and the cream is prevented from being passed outside. It will be understood that the dasher-shaft, with its arms, can readily be taken from the box whenever desired, by extracting the screw $x$, and taking the board D, with its various appendages, from the box.

This churn, being simple in construction, practical, and economical, will quickly and surely perform the functions for which it is designed.

What I claim, is—

The dasher B, with its arms, C C C, constructed as herein described, and used in the box A, in the manner and for the purposes described.

In testimony that I claim the foregoing, I have hereunto set my hand, this 21st day of September, 1867.

JOHN RISHER.

Witnesses:
J. ALLEN,
E. F. POPPLETON.